United States Patent [19]

Kato

[11] Patent Number: 5,053,902
[45] Date of Patent: Oct. 1, 1991

[54] DEVICE FOR PREVENTING TAPE CASSETTE FROM ERRONEOUS INSERTION INTO TAPE DECK

[75] Inventor: Takahiro Kato, Kawagoe, Japan

[73] Assignee: Pioneer Electronic Corporation, Tokyo, Japan

[21] Appl. No.: 364,037

[22] Filed: Jun. 9, 1989

[30] Foreign Application Priority Data

Dec. 14, 1988 [JP] Japan .................................. 63-313824
Dec. 17, 1988 [JP] Japan .................................. 63-317623

[51] Int. Cl.⁵ ............................................. G11B 5/008
[52] U.S. Cl. ................................................... 360/96.5
[58] Field of Search ..................... 360/96.5, 96.6, 93, 360/85, 60

[56] References Cited

U.S. PATENT DOCUMENTS 4,864,439 9/1959 Duurland ............................ 360/96.5

FOREIGN PATENT DOCUMENTS 0066358 4/1985 Japan .................................. 360/96.5
0106092 6/1985 Japan .................................. 360/96.5
0168168 7/1986 Japan .................................. 360/96.5

Primary Examiner—Robert S. Tupper
Assistant Examiner—Andrew L. Sniezek
Attorney, Agent, or Firm—Sughrue, Mion, Zinn, Macpeak & Seas

[57] ABSTRACT

A device for preventing a digital audio tape cassette from erroneous insertion into a tape deck. The device incldues a protruding piece positioned in a cassette insertion hole of the tape deck. The protruding piece is at a position in alignment with a recessed portion of the cassette, which extends the length thereof, and is defined between a stop member and a rear edge of a slider of the tape cassette. If the cassette is attempted to be inserted upside down or reversely with respect to right and left sides thereof, part of the cassette body abuts the protruding piece, which prevents insertion of the cassette into the tape deck.

6 Claims, 3 Drawing Sheets

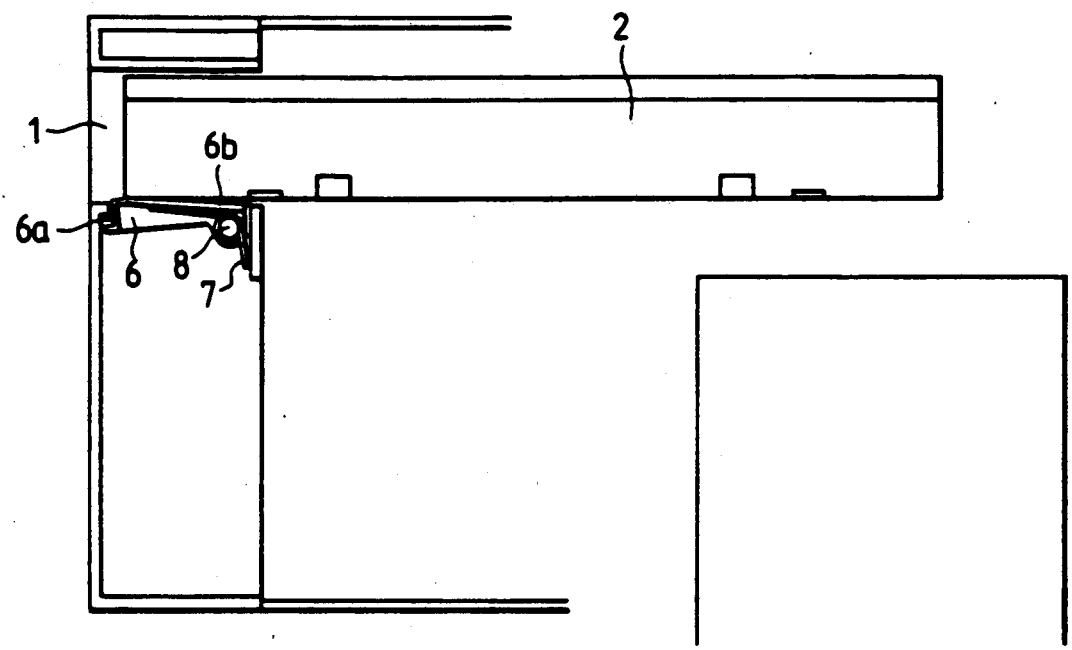
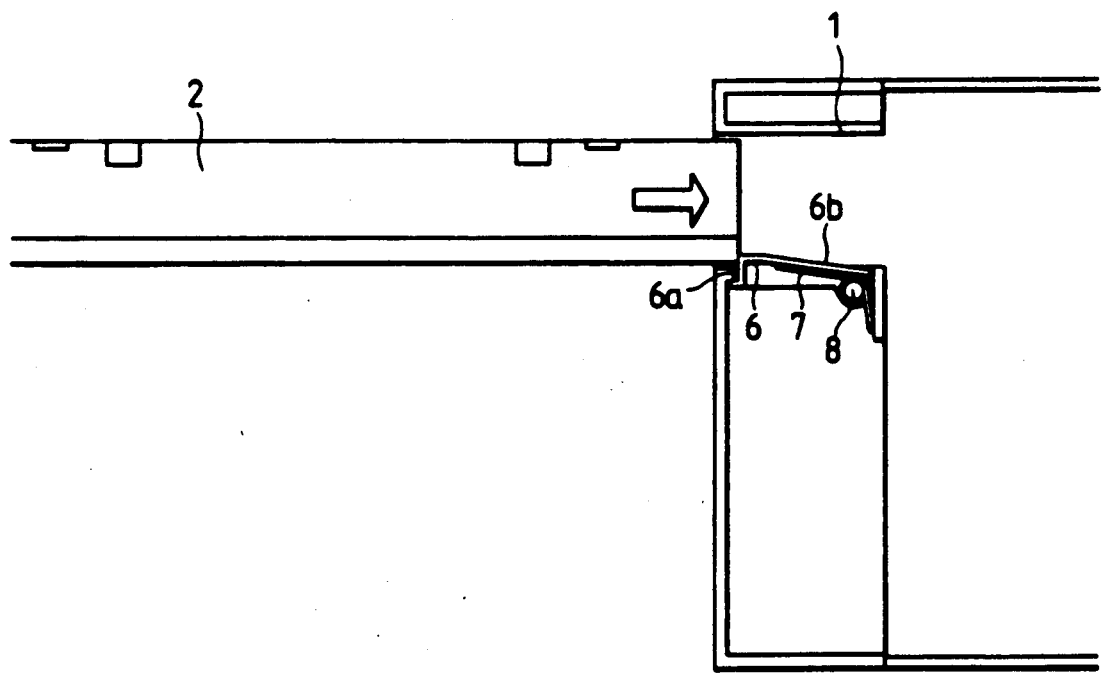

DEVICE FOR PREVENTING TAPE CASSETTE FROM ERRONEOUS INSERTION INTO TAPE DECK

BACKGROUND OF THE INVENTION

The present invention relates to a device for preventing a tape cassette from erroneous insertion into a tape deck. More particularly, the invention relates to such device for preventing a digital audio tape cassette from being erroneously inserted into a take deck.

In a conventional analog audio equipment using a tape cassette, normal and reverse modes are provided for sound reproduction. Therefore, in case of insertion of the tape cassette in its lontidutinal direction into the audio equipment such as a take deck, the tape cassette can be inserted into the tape deck even if the tape is loaded upside down. Accordingly, a user only draws his attention to right and left sides of the tape (tape running or exposed side and opposite side) when inserting the tape into the deck. Further, in the analog audio tape cassette, cross-sectional configuration at the right side of the tape is different from that at the left side thereof, and the tape deck is provided with a cassette insertion hole whose configuration is in conformance with the right and left cross-sectional shapes of the tape cassette. Therefore, the user can easily insert the tape cassette into the tape deck by simply checking right and left side orientation of the tape cassette. As a result, erroneous tape insertion into the tape deck can be avoided.

In case of a digital audio tape cassette, there are provided a lid member at one side (for example right side) of the cassette and a slider at a bottom portion thereof. The lid member is pivotally provided for selectively exposing a running surface of a tape, and the slider is adapted for moving the lid member. The slider locks the lid member at its tape covering posture when the tape cassette is not loaded on a tape deck, and the slider is movable for releasing the locking state of the lid member in order to expose the running surface of the tape when the tape cassette is loaded on the deck.

Some of the conventional digital audio tape deck is designed to allow the tape cassette to be inserted in a direction parallel with the extending direction of the lid member, i.e., the tape cassette is inserted in longitudinal direction thereof. In this case, reproduction by the DAT cassette is performed only by the normal running direction, i.e., no reverse mode is provided because of the tape threading contact with a head drum. Therefore, it is necessary to insert the tape cassette in a correct orientation. More specifically, if the tape is inserted upside down, or if the tape is inserted reversely in right and left sides, the cassette cannot be correctly loaded onto the tape deck.

Further, the DAT cassette has a generally rectangular cross-section in which right and left sides have similar configuration to each other. Therefore, there is a likelihood that a user may reversely insert the tape cassette with respect to right and left sides thereof. If the tape cassette is loaded on the tape deck in erroneous orientation, various mechanical breakdown may occur.

Further, in the conventional DAT cassette, if the lid member is not commpletely closed at non-service period, the exposed tape may be contaminated with dusts or foreign objects or may be damaged.

SUMMARY OF THE INVENTION

It is therefore, an object of the present invention to overcome the above-described drawbacks, and to provide a device for preventing a tape cassette from its erroneous insertion into a tape deck which permits the tape cassette to be inserted in a longitudinal direction thereof.

This and other objects of the present invention will be attained by providing a device for preventing a tape cassette from erroneous insertion into a tape deck having a head and cassette insertion hole. The tape cassette having a lid member for selectively covering a running surface of a tape, a slider movable relative to a cassette body for moving the lid member, and a stop member abuttable on the slider. The slider has a front edge and a rear edge, which provides a first position for positioning the lid member to cover the running surface and a second position for exposing the running surface to the head of the deck. A recessed portion defined between the rear edge of the slider and the stop member in the first position, and the cassette adapted to be inserted in a longitudinal direction thereof in parallel with the lid member through the insertion hole. The device comprising, a protruding means provided at the cassette insertion hole, wherein the protruding means is positioned in alignment with the recessed portion to permit the cassette to pass through the cassette insertion hole.

BRIEF DESCRIPTION OF THE DRAWINGS

In the drawings,

FIG. 3 is a side view of a device for preventing a tape cassette from its erroneous insertion into a tape deck according to a second embodiment of this invention showing an erroneous cassette inserting state;

FIG. 4 is side view of the device according to the second invention showing the tape cassette ejecting state;

DETAILED DESCRIPTION OF THE PREFERRED EMBODIMENTS

Figure 1:
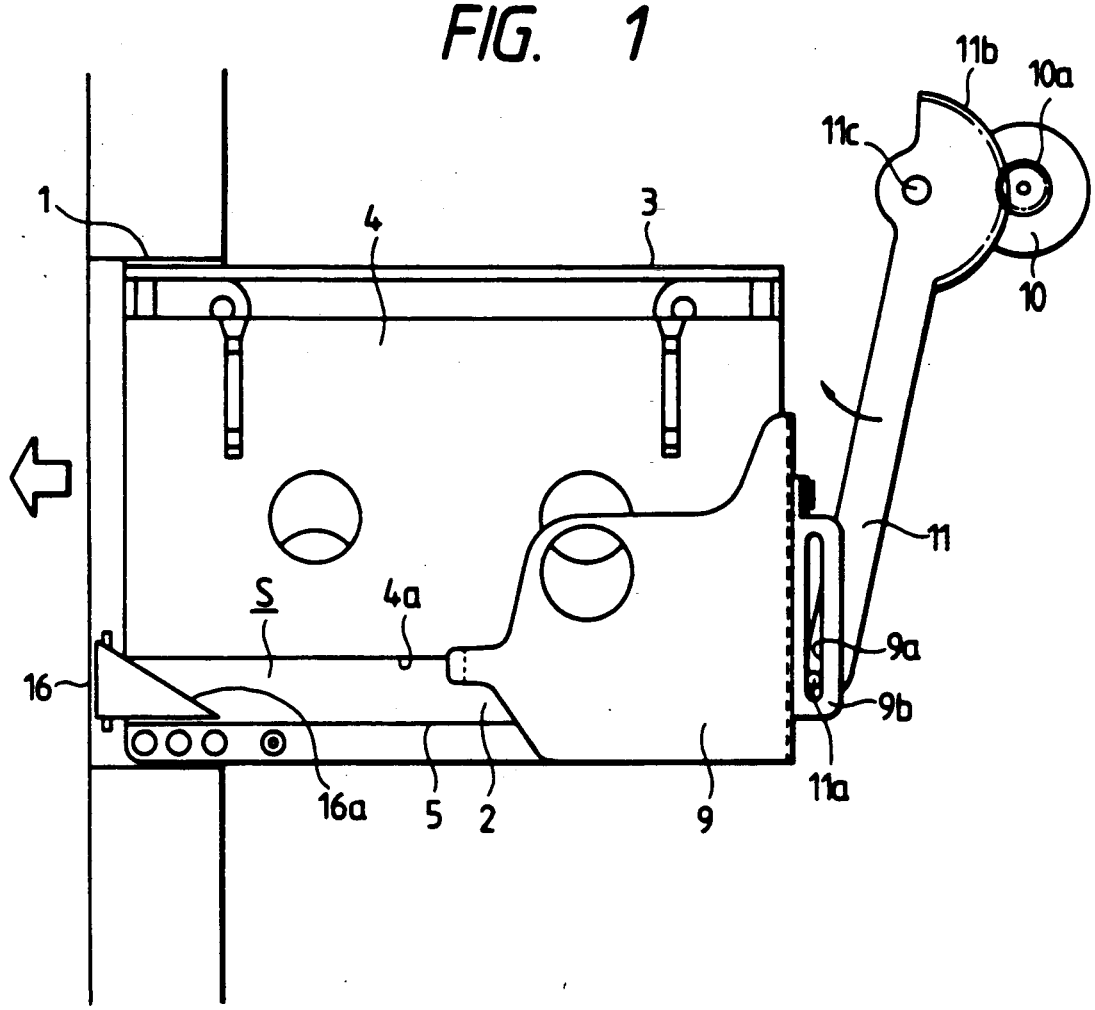
FIG. 1 is a plan view showing a device for preventing a tape cassette from its erroneous insertion into a tape deck according to a first embodiment of this invention.

A first embodiment according to the present invention will be described with reference to FIGS. 1 and 2.

A digital audio tape cassette 2 has one side portion extending in longitudinal direction thereof along which a tape runs. At the side portion, a lid member 3 is pivotally provided for opening and closing the running surface of the tape. Further, a slider 4 is provided slidable with respect to a bottom surface of the tape cassette 2 for pivotally moving the lid member 3, and a stop member 5 is provided at the bottom portion of the cassette 2. Furthermore, a biasing spring (not shown) is provided within the cassette 2 for urging the slider 4 toward the lid member 3 in order to cover the running surface of the tape by the lid member 3.

When the cassette 2 is not loaded on the tape deck, the slider is moved in a first direction and has its first position where the lid is locked at its tape covering position, so that running surface of the tape can be protected. In this state, a space or a recessed portion S is provided between a rear edge portion 4a of the slider 4 and the stop member 5. The recessed portion extends in the longitudinal direction of the cassette in parallel with the lid member 3. On the other hand, when the cassette 2 is inserted into the tape deck and is loaded on a tape driving mechanism (not shown), the slider 4 is moved in a second direction away from the lid member 3 and is abutted on the stop member 5 to obtain its second locked position, so that the locking to the lid member 3 is released to expose the tape against a head drum (not shown). As a result, the tape is brought into threading contact with the head drum. In this case, a width of the recessed portion S defined between the rear edge 4a and the stop member 5 becomes substantially zero because of the abutment of the slider 4 with the stop member 5.

Figure 2:
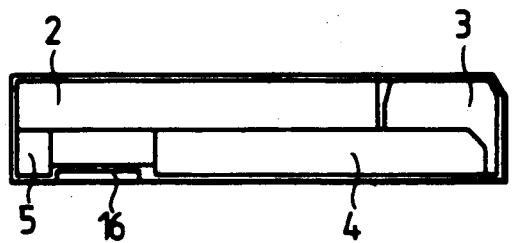
FIG. 2 is a front view showing a tape cassette insertion hole and a leading end face of the tape cassette according to the first embodiment of this invention.

As shown in FIG. 1, the tape deck has a front pannel formed with a cassette insertion hole 1. The hole 1 allows the cassette 2 to be inserted into the deck in longitudinal direction of the cassette. That is, the lid member 3 extends in parallel with the cassette inserting direction.

At the cassette insertion hole 1, a projecting portion 16 is provided. The projection 16 is positioned between the rear edge 4a of the slider 4 and the stop member 5. The projecting portion 16 is positioned to allow the space S to pass therethrough when the tape cassette 2 is correctly inserted. In other words, if the tape cassette 2 is inserted upside down through the hole 1, or the cassette 2 is reversely inserted with respect to right and left sides thereof, the projection 16 abuts an outer casing of the cassette 2. Accordingly, the cassette 2 cannot be inserted into the deck.

The projection 16 has a slant surface 16a abuttable on the rear edge 4a of the slider 4. The slant surface 16a serves to assist sliding motion of the slider in the first direction (toward the lid member 3) if the biasing force of the spring cannot overcome the sliding resistance given by the slider 4 and the bottom surface of the cassette 2.

Within the tape deck, a cassette holder 9 is provided. The holder 9 has one end integrally provided with a bracket 9b in which a slot 9a is formed. Further, an arm 11 has one end portion provided with a pin 11a slidably engageable with the slot 9a. The arm 11 has another end portion pivotally supported at a pivot shaft 11c and provided with a gear 11b meshedly engageable with a gear 10a of a motor 10. The motor 10 is driven in response to a cassette eject signal.

Upon completion of insertion of the tape cassette 2, the cassette 2 is held by the holder 9. In this case, the slider 4 is in abutment with the stop member 5. When the eject signal is sent to the motor 10, the arm 11 is pivotally moved about the pivot shaft 11c, so that the holder 9 is moved toward a direction indicated by an arrow in FIG. 1, whereby cassette ejection is completed.

During this eject motion of the cassette 2, the slider 4 begins to move in the first direction so that the width of the space S becomes increased, and is urged toward the lid member 3 by the biasing spring accomodated in the cassette 2 in order to cover the running face of the tape by the lid 3. In this case, however, if large sliding resistance is presented, the slider 4 may not be completely moved to its first position (only a narrow space S is provided between the rear edge 4a and the stop member 5). Therefore, the slant surface 16a of the projection 16 assists movement of the slider 4 in the first direction because of the abutment with the rear edge 4a of the slider 4. In other words, the slider 4 is gradually urged toward the first direction because of the contact between the rear edge 4a of the slider 4 and the slant surface 16a of the projection 16 in accordance with the ejecting motion of the cassette 2. Accordingly, when the cassette 2 is completely ejected out of the deck, the lid member 3 completely covers the running surface of the tape, and the lid member 3 is secured at its locking position.

A second embodiment according to this invention will next be described with reference to FIGS. 3 thru 5 wherein like parts and components are designated by the same reference numerals and charactors as those shown in FIGS. 1 and 2.

In the first embodiment, the projection 16 is provided at a position in alignment with the space S. On the other hand, in the second embodiment, a locking piece 6 is pivotally supported to the insertion hole 1 by a pivot shaft 8 at the position in alignment with the space or the recess S. Further, in the first embodiment, the projection 16 is stationarily provided for positively urging the slider 4. On the other hand, in the second embodiment, the locking piece 6 is pivotally movable so that the locking piece 6 is not become an obstacle for ejecting movement of the cassette 2.

Figure 5:
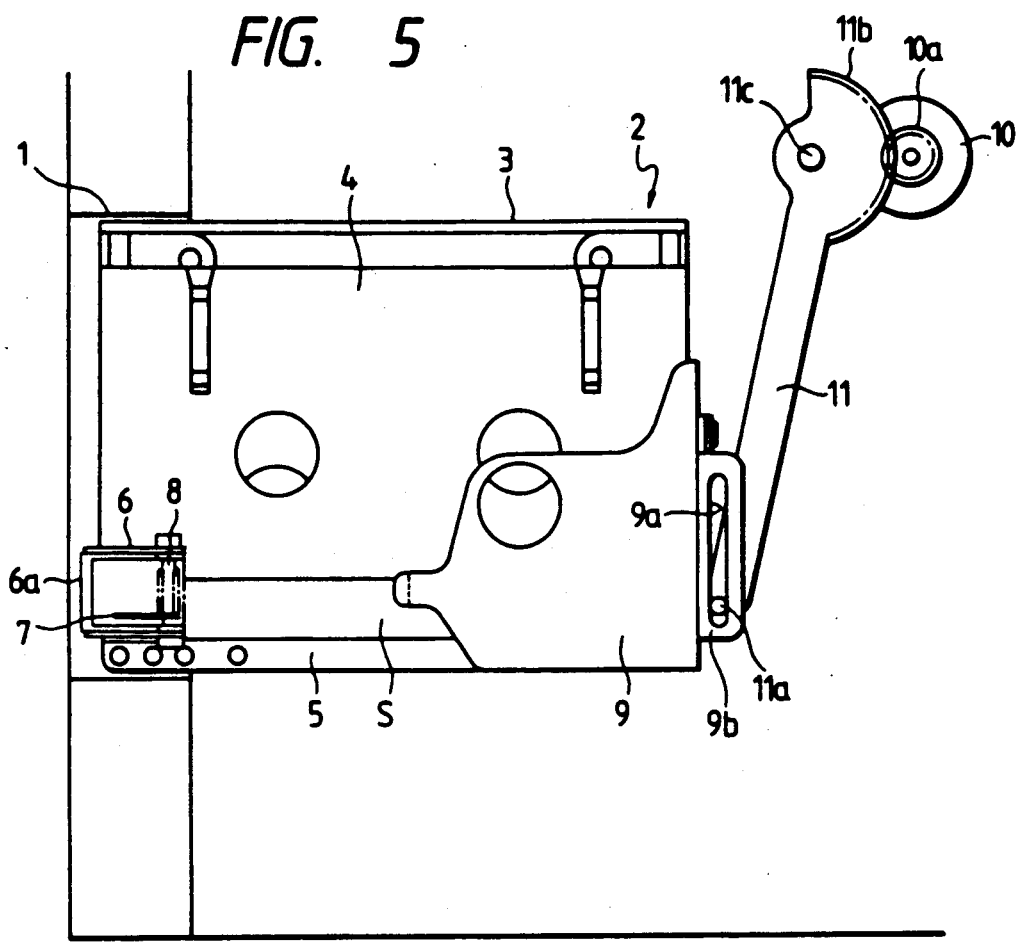
FIG. 5 is a bottom view showing the device according to the second embodiment of this invention.

As shown in FIGS. 3 thru 5, the locking piece 6 has one end portion provided with a vertical portion 6a at a position adjacent the insertion hole 1 and has another end portion pivotally supported by the pivot shaft 8. Further, a tiltable plate 6b is provided between the vertical portion 6a and the pivot portion. Around the pivot shaft 8, a torsion spring 7 is disposed so as to normally urge the plate 6b upwardly. That is, the vertical portion 6a is normally lifted upwardly so as to allow the recessed portion S to pass therethrough, but prevents the cassette 2 from being inserted through the hole 1 by the abutment between the vertical portion 6b and the cassette body if the cassette is erroneously oriented as shown in FIG. 3. Accordingly, in the ascent position of the locking piece 6, the piece 6 has a function equivallent to the projection 16 in the first embodiment. Therefore, the cassette 2 having correct orientation can only be passed through the locking piece 6 so as to complete the cassette insertion.

Upon completion of the cassette insertion, the slider 4 is at the second position (close to the stop member 5). Then when the eject signal is inputted into the motor 10, the cassette 2 is moved toward outside. In this state, the slider will begin to move in the first direction (toward the lid member 3). However, if large sliding resistance is presented, the slider 4 may not be smoothly moved in the first direction. As a result, the width of the recess S is still smaller than the width of the tiltable plate 6b. In such case, the locking piece 6 is pivotally moved downwardly against the biasing force of the torsion spring 7, so that the locking piece 6 is offset from the moving locus of the cassette 2. As a result, the cassette 2 can be smoothly ejected with avoiding abutment between the locking piece 6 and the edge portion 4a of the slider 4. Therefore, in the second embodiment, if large slide resistance is presented between the slider 4 and the bottom face of the cassette body, the slider 4 is not forcibly moved in the first direction (toward the lid member 3), but the slider 4 urges the locking piece 6 downwardly against the biasing force of the torsion spring 7 for completion of cassette ejection.

A third embodiment according to this invention will be described with reference to FIGS. 6 and 7. The third embodiment may be the combination of the first and the second embodiments.

Figure 6:
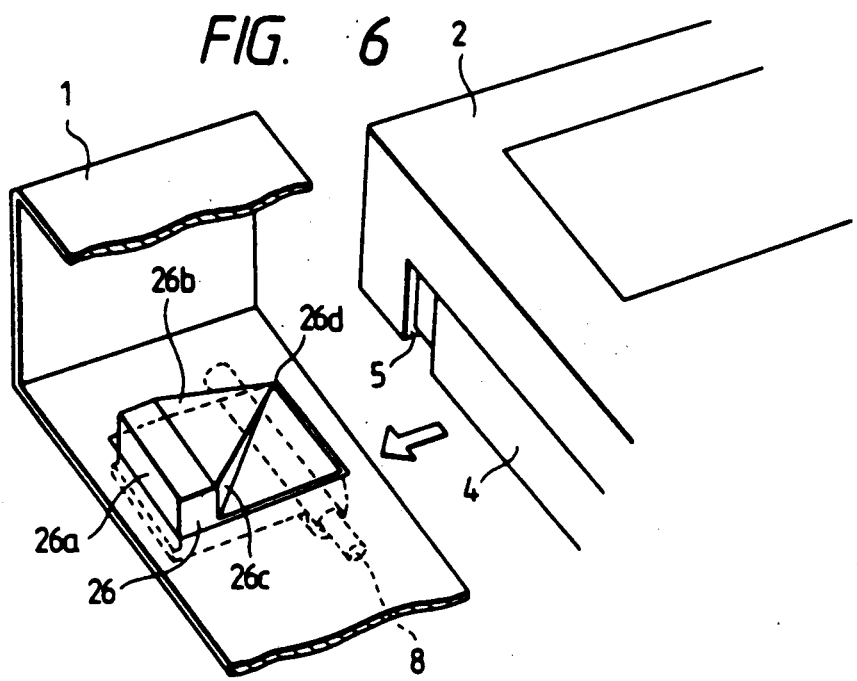
FIG. 6 is a perspective view showing an essential portion of a device for preventing the tape cassette from its erroneous insertion according to a third embodiment of this invention.
Figure 7:
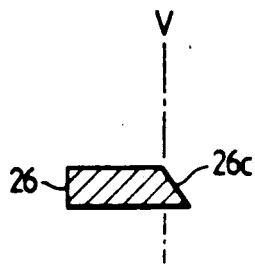
FIG. 7 is a cross-sectional view showing a locking piece used in the third embodiment.

In FIG. 6, the cassette 2 is positioned within the tape deck. Similar to the second embodiment, a locking pice 26 is pivotally supported to the deck body by a pivot shaft 8, and a vertical portion 26a is normally urged upwardly by a torsion spring (not shown). The locking piece 26 also has a tiltable plate 26b which is equivallent to the plate 6b in the second embodiment and a slant surface 26c confronting the rear edge 4a of the slider 4. An accute edge 26d is provided at a distal end of the locking piece 26. The slant surface 26c is equivallent to the slant surface 16a in the first embodiment. As shown in FIG. 7, the slant surface 26c is also slanted with respect to a vertical plane V.

For cassette insertion, the locking piece 26 can align the recessed portion S of the cassette 2, so that the cassette 2 can pass through the protruding locking piece 26. On the other hand, if the cassette 2 is erroneously inserted, the body of the cassette 2 abuts the protruding locking piece 26. Therefore, the cassette 2 cannot be any more inserted into the deck.

For ejection of the cassette 2, if the rear edge 4a of the slider 4 is in contact with the stop member 5, no space S is provided. Therefore, the slider 4 rides over the tiltable plate 26b, and the tiltable plate 26b is pivotally moved downwardly during ejecting travel of the cassette 2 similar to the second embodiment. On the other hand, if the rear edge 4a of the slider 4 is spaced away from the stop member 5, but the slider 4 is not sufficiently moved toward the first direction due to large sliding resistance, the accute edge 26d enters the narrow space S, and the rear edge 4a is brought into contact with the slant surface 26c. As a result, the slider 4 is gradually moved toward the lid member 3 because of the contact between the rear edge 4a and the slant surface 26c in accordance with the ejecting travel of the cassette 2.

In view of the foregoing, according to the present invention, the protruding means 6, 16, 26 is provided at a position in alignment with the recessed or spaced portion S. Therefore, the cassette having correct orientation can only pass through the protruding means so that the cassette can be inserted through the insertion hole and loaded on the deck. On the other hand, if the cassette is inserted upside down or inversely inserted with respect to right and left sides thereof, the cassette body abuts the protruding means, and therefore, the cassette cannot pass through the insertion hole. Accordingly erroenous cassette loading can be obviated, to thereby avoid accidental mechanical breakdown.

Further, in the first and third embodiments, during ejecting motion of the cassette, the slider 4 can be returned back toward the lid member because of the contact between the slider edge and the slant surface of the protruding means. Accordingly, the lid member can cover the running surface of the tape when the cassette is discharged out of the deck. As a result, the lid member can be locked at its tape covering position, to thereby avoid accide tal sliding of the slider at non-service period of the c ste.

Furthermore, in the second and third embodiments, the protruding means can be moved away from the moving locus of the cassette during ejecting motion of the cassette. Therefore, the protruding piece does not interfare with the cassette.

While the invention has been described in detail and with reference to specific embodiments, it would be apparent for those skilled in the art that various changes and modifications can be made therein without departing from the spirit and scope of the invention.

What is claimed is:

1. A device for preventing a tape cassette from erroneous insertion into a tape deck having a cassette insertion hole, the tape cassette having a lid member for selectively covering a running surface of a tape which provides recorded information to the tape deck during play, a slider movable relative to a cassette body for moving the lid member, and a stop member abuttable against the slider, the slider having a front edge located nearest the lid member and a rear edge located farthest from the lid member, the slider having a first position for positioning the lid member to cover the running surface and a second position for positioning the lid member to expose the running surface to the deck, a single recessed portion, which extends the length of the cassette and is defined between the stop member and the rear edge of the slider when located in the first position, and the cassette being adapted for insertion into the insertion hole in a direction parallel to the length of the recessed portion, the device comprising:

a protruding means provided at the cassette insertion hole, for permitting the cassette to pass through the cassette insertion hole only when the cassette is properly inserted, said protruding means travels the length of and within the recessed portion during insertion of the cassette into the insertion hole.

2. The device as claimed in claim 1, wherein the protruding means has a slanted surface confronting the rear edge of the slider whereby the slanted surface forces the slider into said first position to cover the running surface before said cassette is removed from the deck through said cassette insertion hole.

3. The device as claimed in claim 2, wherein the protruding means is stationary and immobile in any direction relative to the tape deck.

4. The device as claimed in claim 1, wherein the protruding means is pivotally supported to the deck, the protruding means having a first pivot position protrudable into the recessed portion and having a second pivot position for locating said protruding means outside the recess portion.

5. The device as claimed in claim 4, wherein the protruding means is tiltable and comprises a first portion, and a second portion positioned at one end of the first portion, said one end located nearest an outer surface of the cassette insertion hole, a pivot for pivoting said protruding means is positioned at an opposite end of the first portion with respect to said one end said opposite end located farthest from said outer surface, and a biasing means disposed at the pivot providing support for the protruding means for normally biasing the second portion into the first pivot position.

6. The device as claimed in claim 5, wherein the first portion includes a slanted surface confronting the rear edge of the slider to force said slider into said first position to cover the running surface before said cassette is removed from the deck.

* * * * *